H. FREEMAN.
ELECTRIC FURNACE.
APPLICATION FILED APR. 20, 1918.
1,277,899.
Patented Sept. 3, 1918.
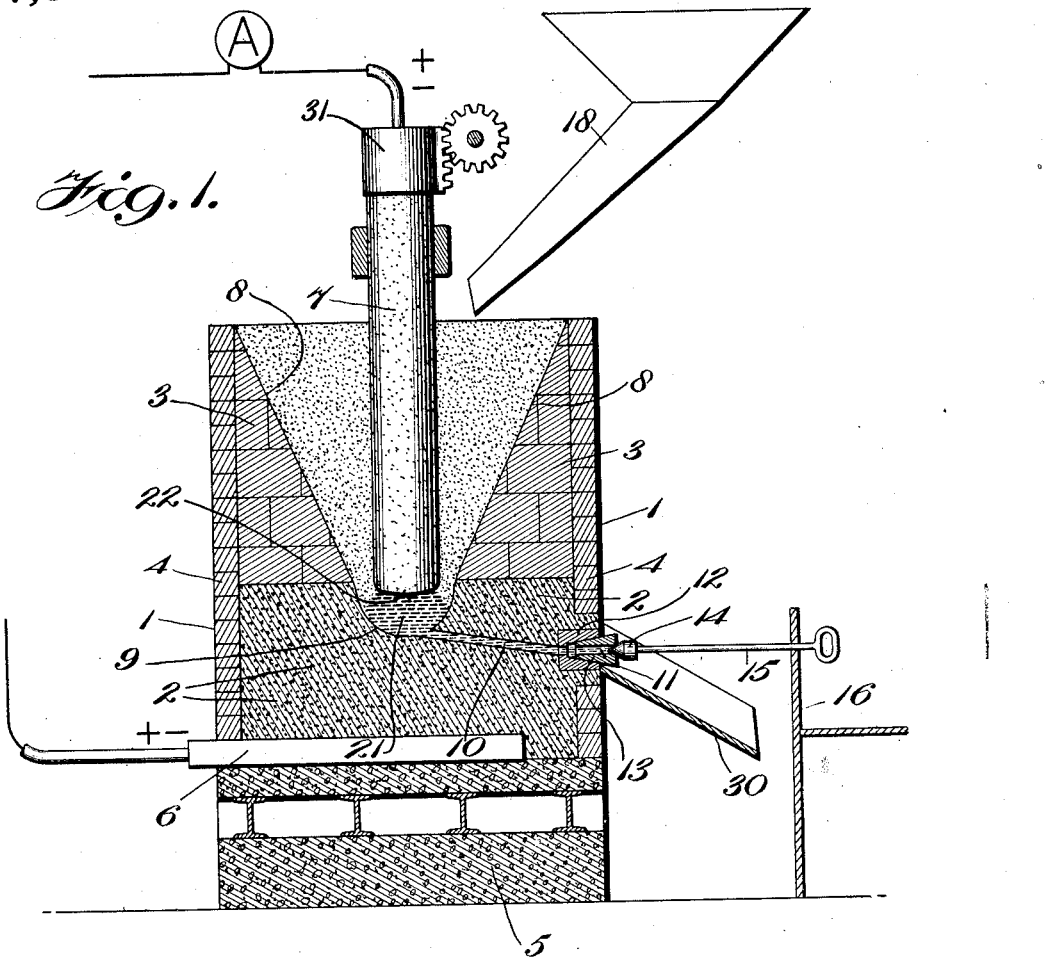
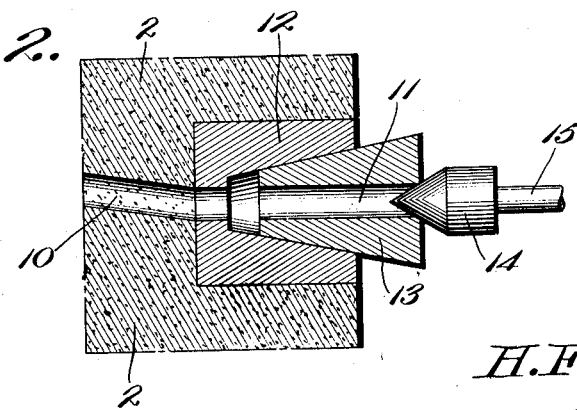
Inventor
H. Freeman, by
T. M. Witherspoon
Attorney

UNITED STATES PATENT OFFICE.

HORACE FREEMAN, OF NIAGARA FALLS, ONTARIO, CANADA, ASSIGNOR TO AMERICAN CYANAMID COMPANY, OF NEW YORK, N. Y., A CORPORATION OF MAINE.

ELECTRIC FURNACE.

1,277,899.  Specification of Letters Patent.  Patented Sept. 3, 1918.

Application filed April 20, 1918. Serial No. 229,830.

*To all whom it may concern:*

Be it known that I, HORACE FREEMAN, a subject of the King of Great Britain, residing at Niagara Falls, in the Province of Ontario and Dominion of Canada, have invented certain new and useful Improvements in Electric Furnaces; and I do hereby declare the following to be a full, clear, and exact description of the invention, such as will enable others skilled in the art to which it appertains to make and use the same.

This invention relates to electric furnaces especially adapted for the making of sodium cyanid from a mixture of calcium cyanamid and sodium chlorid and has for its object to improve the furnaces of this nature heretofore proposed.

With this and other objects in view the invention consists in the novel details of construction and combinations of parts more fully hereinafter set forth, and particularly pointed out in the claims.

Referring to the accompanying drawings forming a part of this specification, in which like numerals designate like parts in all the views—

Figure 1 is a diagrammatic sectional view of an electric furnace made in accordance with this invention; and—

Fig. 2 is an enlarged detail view of a portion of the parts shown in Fig. 1.

In order that the peculiar fitness of this furnace, for the purpose in hand, may be the better understood, it is said:—sodium cyanid is to be made therein from substantially equal parts by weight of commercial calcium cyanamid or lime nitrogen, and common salt NaCl, mixed with a small quantity of calcium carbid $CaC_2$, or of lamp black or other form of carbon which has not been heated to a temperature higher than say 800° C. When this mixture is suddenly raised to a high temperature or to say from 1200° C. to 1400° C., then the carbon that is normally present in the lime nitrogen, and which is at temperatures of say 800° C. or 900° C. chemically inert, becomes chemically active; so that when the sodium chlorid reacts upon the calcium cyanamid $CaCN_2$ present, to form sodium cyanamid, $Na_2CN_2$, and calcium chlorid, said sodium cyanamid instead of immediately decomposing as heretofore, is attacked by the said carbon of the lime nitrogen and a large portion of the sodium cyanamid is converted into sodium cyanid NaCN.

Stated in other language, prior to this invention, when the mixture was gradually heated as has been heretofore customary, the sodium cyanamid began to form when the temperature reached say 800° C. and as the carbon of the lime nitrogen at that temperature was inert toward said sodium cyanamid, considerable portions of the latter would immediately decompose into gases and vapors and produce such a foaming that it was almost impossible to keep the charge in the crucible.

On the other hand, when the temperature of said carbon is suddenly raised, as is done by this furnace, to a point where it becomes chemically active, it attacks said sodium cyanamid as fast as it is formed, and converts it into sodium cyanid, while the carbon set free from the calcium carbid, or the additional chemically active carbon which has been added to the charge, attacks any residue of sodium cyanamid that may escape the action of said lime nitrogen carbon, with the result that no foaming at all results.

Now, in order to attain these most desirable results, I have invented an electric furnace especially adapted to carry out the process, and possessing the following characteristics—

It comprises a crucible of a suitable refractory material such as carbon, which is not unduly attacked by the very corrosive fused alkali and basic charge fused therein; and in order to attain the very steep temperature gradient required by the reaction, the smelting zone is restricted in volume, and therefore in conductivity, as compared with the other current conducting portions of the furnace such as the electrodes, the furnace, lining, etc. As it is preferred to carry on the operation continuously, the furnace is provided with a continuous feed, and a tap hole for a continuous or nearly continuous discharge. Again, the dimensions of the various parts of the furnace are so proportioned to the energy input and to the smelting capacity that a simple and easy means of temperature control may be had; for it is self evident that when one is working with a furnace having a restricted smelting zone, a steep temperature gradient, and a comparatively large power input, dangerous overheatings or severe electrical disturbances may readily occur; and therefore especial care must be taken to prevent such happenings or to quickly and easily correct them, when they occur.

All of the above conditions and requirements are complied with in the construction shown in the drawings in which—1 represents any suitable form of furnace provided with a hearth made of refractory and electrically conducting material 2. Above this hearth is continued a shaft of suitable refractory material 3, and the whole is surrounded by a layer of heat insulating material 4. 5 represents a suitable foundation for the furnace and 6 an electrical connection to the electrically conducting bottom of the furnace. 7 is a dependent electrode projecting downwardly through the shaft of the furnace, and 10 represents the tap hole which may be closed by any suitable plug, preferably of the type illustrated and described later.

The charge material is fed into the furnace as for example through the spout 18. The hearth is so designed with respect to the electrode that a very slight change in the level of the liquid material 21 collected therein, causes an abnormally large current fluctuation. This is accomplished by constricting the shaft of the furnace near the extreme end 22 of the electrode, and by making the electrode of such dimensions that the energy tends to concentrate toward the portion 9 of the hearth directly underneath its point.

In operation, the charge fed into the top of the shaft, slowly works its way downward along the sloping sides 8, and since there is little or no gas given off in the furnace reaction, it does not become greatly preheated by the time it reaches the actual smelting zone of the furnace. Here in this active zone, the comparatively cold charge suddenly strikes a region of abnormally high energy development and is consequently rapidly melted. The fluid mass 21 collects in the bottom of the hearth, and there it accumulates and rises toward the end 22 of the electrode. As the fluid mass 21 is electrically conductive, whereas the comparatively cold charge is only very poorly conductive, the resistance of the furnace decreases at a rapid rate as the fused mass rises toward the electrode. Due to the said high energy development to the said restriction volume of the hearth, and smelting zone, and to the comparatively small amount of fused material, a small change in the volume of said fused material will cause a considerable change in the electrical conditions in the furnace. But, operating at a fairly constant potential, such as one would obtain from a transformer, any electrical disturbance may be noted by the reading of an ammeter inserted in the electrical circuit of the furnace; and from the rapid increase in current as noted by this ammeter, one can determine fairly accurately the quantity of fused material in the furnace at any given time. It therefore follows that the experience gained in operating a given sized furnace, with a given electrical input, one can determine at just what point to begin tapping, and can easily regulate the tapping, so as to prevent undue overheating of the furnace charge or any undue electrical demand upon the source of energy. It is self evident that by a movement of the electrode 7 as is commonly practised in electric furnace operations, a similar control of the furnace can be had, and that therefore, both means of regulation are available for controlling the furnace. Inasmuch as the former method is the most simple, it is to be preferred over the movement of the electrode, particularly as the latter method is likely to result in a change in the electric characteristics of the furnace in relation to the desirable temperature gradient.

The electrode 7 is provided with any suitable means 31 for its regulation. The tap hole 10, because of the corrosive action of the furnace charge, is preferably closed in the manner illustrated in detail in Fig. 2. That is to say, into the conducting bottom of furnace 2, is fixed a metal block 12. This block 12 serves as a bushing for holding the removable block 13, having the bore 11, which block 13 is subject to considerable wear and tear in the molten material, and in use is closed by the block 14. These various metal parts may be made water cooled for their better preservation, but this is not absolutely necessary. For manipulating the block or plug 14, it is provided with an extension 15, and may be operated from a platform 16 at some distance away from the furnace. The platform is provided with an upwardly extending shield as shown to protect the operator. The use of a tap hole of this form, possesses the very great advantage of throwing the wear and tear incident to tapping the highly corrosive and hot crude cyanid, to a cheap and easy removable bushing, which can be replaced as worn out. For making this replacement, it is merely necessary to disconnect the furnace from its source of electrical energy, tap the hearth dry and replace the bushings 12 and 13 from the outside, a matter of only two or three minutes interruption to the furnace operation.

In other words, with a suitable voltage and current density on the lower surface of the electrode 7 a restricted molten pool 21 may be readily and suddenly formed. After it is once formed there is found to be no difficulty in maintaining a sufficient density of current to insure that the carbon of the lime nitrogen will remain chemically active, and by suitably manipulating the rod 15 and plug 14, the charge material 20 will gravitate by its own weight down into said pool 21, and thus the product consisting of crude liquid sodium cyanid may be so withdrawn through the tap hole by a continuous manipulation of the rod 15 as will insure a smooth operation of the furnace.

It is a very important feature of this invention that the arrangement of parts is such as to cause the graphitic carbon of the lime nitrogen to be so suddenly raised in temperature as to render it chemically active, and to thus unite with the sodium cyanamid substantially as fast as it is formed. For, any sodium cyanamid that is not acted upon by the said graphitic carbon is immediately acted upon by the nascent carbon liberated from the calcium carbid of the charge, or it is acted upon by the chemically active carbon which has been added to the charge with the result that no foaming at all takes place, and therefore, there is no tendency for evolved gases to raise the charge material or lift it from the vicinity of the molten pool 21.

It results that said charge material smoothly and evenly works down into the pool 21; and as the temperature is quite high, the material is so fluid as to readily flow along the passage 10 and out of the tap hole 11.

The above description represents one form of my furnace for the production of crude cyanid, and it is obvious that those skilled in the art may vary the details without departing from the spirit of the invention, and therefore, I do not wish to be limited to the above disclosure except as may be required by the claims.

What I claim is:—

1. In a furnace for making sodium cyanid from lime nitrogen and sodium chlorid, the combination of a hearth of conducting material having a restricted crucible chamber; a shaft having tapering walls leading to said chamber; a depending electrode located in said shaft whose lower end terminates in said chamber and restricts the passage of charge material thereto; a tap hole leading from the bottom of said chamber; means provided with an extension for plugging and opening said tap hole at will, and a shield to protect the operator, substantially as described.

2. In a furnace for making sodium cyanid from lime nitrogen and sodium chlorid, the combination of a hearth of conducting material having a restricted crucible chamber; a shaft having outwardly inclined walls leading from said chamber; an adjustable depending electrode located in said shaft, of a size to restrict the passage of charge material into said chamber and terminating sufficiently close to said conducting hearth to insure that a restricted molten pool of charge material will be maintained in said chamber; a tap hole leading from said chamber; a bushing lining the outer end of said tap hole; and a plug to control the flow of material through said bushing, substantially as described.

3. In a furnace for making sodium cyanid from lime nitrogen and sodium chlorid, the combination of a hearth of conducting material having a restricted crucible chamber; a dependent electrode of a size to restrict the passage of material to said chamber and terminating sufficiently close to said hearth to insure a restricted pool of molten material on said hearth; a tap hole from said crucible; a bushing lining the outer end of said tap hole; a removable hollow block fitting said bushing; and a plug closing said block, substantially as described.

4. In a furnace for making sodium cyanid from lime nitrogen and sodium chlorid the combination of a restricted crucible having walls of conducting material; a depending electrode entering said crucible, restricting the passage of material thereto, and the lower end of which extends sufficiently close to said walls to generate sufficient heat to render the graphitic carbon in the lime nitrogen chemically active in the molten charge; means for leading said molten charge out of said crucible; means comprising a plug and extension for controlling the flow of said charge from the furnace; and a shield for protecting the operator while manipulating said last named means, substantially as described.

In testimony whereof I affix my signature, in presence of two witnesses.

HORACE FREEMAN.

Witnesses:
V. G. CHAPMAN,
D. I. WITCHORN.